United States Patent
Platus et al.

(10) Patent No.: US 9,733,027 B2
(45) Date of Patent: Aug. 15, 2017

(54) THERMAL STRAPS FOR SPACECRAFT

(71) Applicant: MINUS K. TECHNOLOGY, INC., Inglewood, CA (US)

(72) Inventors: David L. Platus, Santa Monica, CA (US); Erik K Runge, Buellton, CA (US)

(*) Notice: Subject to any disclaimer, the term of this patent is extended or adjusted under 35 U.S.C. 154(b) by 1000 days.

(21) Appl. No.: 14/155,977

(22) Filed: Jan. 15, 2014

(65) Prior Publication Data
US 2014/0190677 A1    Jul. 10, 2014

Related U.S. Application Data

(63) Continuation-in-part of application No. 13/587,207, filed on Aug. 16, 2012, now Pat. No. 9,327,847.

(51) Int. Cl.

| | |
|---|---|
| *F28F 9/26* | (2006.01) |
| *F16F 15/04* | (2006.01) |
| *F28F 13/00* | (2006.01) |
| *F25D 19/00* | (2006.01) |
| *B64G 1/50* | (2006.01) |
| *F28D 21/00* | (2006.01) |
| *B64G 1/22* | (2006.01) |

(52) U.S. Cl.
CPC .................. *F28F 9/26* (2013.01); *B64G 1/50* (2013.01); *F16F 15/04* (2013.01); *F25D 19/006* (2013.01); *F28F 13/00* (2013.01); *B64G 2001/228* (2013.01); *F28D 2021/0021* (2013.01); *F28F 2013/006* (2013.01); *F28F 2255/02* (2013.01); *F28F 2265/26* (2013.01); *F28F 2265/30* (2013.01)

(58) Field of Classification Search
CPC ..... F28F 9/26; F28F 13/00; B64G 1/50; F16F 15/04; F25D 19/006; G03F 7/709
USPC ......................................................... 165/80.5
See application file for complete search history.

(56) References Cited

U.S. PATENT DOCUMENTS

| | | | | |
|---|---|---|---|---|
| 4,740,057 A | * | 4/1988 | Dezso | G02B 7/026 267/160 |
| 5,030,876 A | * | 7/1991 | EerNisse | H03H 9/0514 310/353 |
| 5,178,357 A | | 1/1993 | Platus et al. | |
| 5,310,157 A | * | 5/1994 | Platus | F16F 3/026 248/619 |
| 5,370,352 A | | 12/1994 | Platus | |
| 5,390,892 A | | 2/1995 | Platus et al. | |
| 5,549,270 A | | 8/1996 | Platus et al. | |
| 5,669,594 A | | 9/1997 | Platus et al. | |
| 5,794,909 A | | 8/1998 | Platus et al. | |
| 5,833,204 A | | 11/1998 | Platus et al. | |

(Continued)

*Primary Examiner* — Tho V Duong
(74) *Attorney, Agent, or Firm* — Fulwider Patton LLP

(57) ABSTRACT

Negative-stiffness-producing mechanisms can be incorporated with structural devices that are used on spacecraft that provide thermal coupling between a vibrating source and a vibration-sensitive object. Negative-stiffness-producing mechanisms can be associated with a flexible conductive link (FCL) or "thermal strap" or "cold strap" to reduce the positive stiffness of the FCL. The negative-stiffness-producing mechanisms can be loaded so as to create negative stiffness that will reduce or negate the natural positive stiffness inherent with the FCL. The FCL will still be able to provide maximum thermal conductance while achieving low or near-zero stiffness to maximize structural decoupling.

21 Claims, 8 Drawing Sheets

(56) References Cited

U.S. PATENT DOCUMENTS

| | | | |
|---|---|---|---|
| 6,676,101 B2 * | 1/2004 | Platus | F16F 15/02 248/566 |
| 7,087,906 B2 * | 8/2006 | Hazelton | G03F 7/709 250/440.11 |
| 7,239,369 B2 * | 7/2007 | Jacobs | G03F 7/709 355/53 |
| 8,132,773 B1 | 3/2012 | Platus | |

* cited by examiner

THERMAL STRAPS FOR SPACECRAFT

CROSS-REFERENCES TO RELATED APPLICATIONS

This application claims priority from U.S. application Ser. No. 13/587,207, filed on Aug. 16, 2012 which is incorporated by reference in its entirety.

BACKGROUND OF THE INVENTION

This invention relates generally to improved designs of devices used on spacecraft and commonly referred to as thermal straps or cold straps or flexible conductive links (FCLs) for providing thermal (conductive) coupling and structural decoupling between cryogenic components such as a vibrating cooling source and a motion-sensitive element or focal plane array (FPA) having highly critical alignment requirements. The present invention provides means for reducing the stiffness of thermal straps through the use of negative-stiffness mechanisms thereby improving their structural decoupling. In the subsequent discussions, the terms thermal strap, FCL and cold strap are used interchangeably. Also, the combination of negative-stiffness mechanisms with a thermal strap or an FCL or a cold strap will be referred to as a "negative-stiffness thermal strap (NS thermal strap)" or a "negative-stiffness FCL (NSFCL)" or a "negative-stiffness cold strap (NS cold strap)."

A critical tradeoff in the design of the thermal strap is maximizing the thermal conductance, which improves the overall performance of the thermal strap, and maximizing the structural decoupling which requires minimizing the stiffness. These design factors present conflicting design goals to the spacecraft engineer. It would therefore be beneficial if a thermal strap or other coupling device could attain maximum thermal conductance while at the same time maximizing structural decoupling in order to effectively isolate vibrations from the motion-sensitive equipment. My previous thermal strap invention, Improved Thermal Straps for Spacecraft, U.S. application Ser. No. 13/587,207, filed on Aug. 16, 2012, solves these and other needs.

In my previous thermal strap invention, it was shown that negative-stiffness mechanisms could improve the structural decoupling of a thermal strap or could improve the thermal conductance, or could improve both the structural decoupling and the thermal conductance. In that invention two thermal straps were used in series. The first thermal strap was combined with negative-stiffness mechanisms that removed much or all of the stiffness of the first thermal strap in the axial direction and in directions transverse to the axial direction. The first thermal strap was relatively stiff in tilt, or rotation about any transverse axis. The second thermal strap provided low tilt stiffness and structural decoupling in tilt but did not have the benefit of negative-stiffness mechanisms. However, with the higher thermal conductance that can be achieved in the first thermal strap for the same or lower axial and transverse stiffnesses, the thermal conductance of the second thermal strap can be made lower to allow for a lower tilt stiffness so that the combined thermal straps will provide improved thermal coupling or improved structural decoupling, or both improved thermal coupling and structural decoupling compared with conventional thermal straps.

My prior thermal strap invention relied on mechanisms which can apply negative stiffness to an elastic structure having positive stiffness in order to cancel, or nearly cancel the positive stiffness of the structure. These previous inventions utilized negative-stiffness mechanisms to provide vibration isolation systems capable of supporting an object having weight (an object with mass in a gravitational field) and providing low stiffness and low natural frequencies in both the vertical (gravity) direction and in the lateral or horizontal directions. The low horizontal stiffness and low horizontal natural frequencies were achieved by using the weight of the object to load vertically oriented beam-columns close to their critical buckling loads (the loads at which their lateral stiffness becomes zero). This approach made use of the "beam-column" effect, which refers to the reduction in the bending stiffness of a beam when it is loaded in compression to make the beam behave as a beam-column. It can be shown that the beam-column effect in a vertically oriented beam-column is equivalent to a horizontal spring and a negative-stiffness mechanism, and the magnitude of the negative stiffness increases with an increase in the weight load. The low vertical stiffness and low vertical natural frequency was achieved by using a support spring connected to a negative-stiffness mechanism in the form of horizontally oriented beam-columns which are spring loaded in compression so that the negative stiffness removes much of the stiffness of the support spring and the stiffness of the beam-columns. These vibration isolation systems are used to isolate vibration-sensitive objects from the vertical and horizontal vibrations of a vibrating support, i.e., to reduce the magnitude of the vibrations transmitted from the vibrating support to the object.

These prior vibration isolation systems are described in U.S. Pat. No. 5,530,157, entitled "Vibration Isolation System" issued May 10, 1994, U.S. Pat. No. 5,370,352, entitled "Damped Vibration System" issued Dec. 6, 1994, U.S. Pat. No. 5,178,357, entitled "Vibration Isolation System" issued Jan. 12, 1993, U.S. Pat. No. 5,549,270, entitled "Vibration Isolation System" issued Aug. 27, 1996, U.S. Pat. No. 5,669,594, entitled "Vibration Isolation System" issued Sep. 23, 1997, U.S. Pat. No. 5,833,204, entitled "Radial Flexures, Beam-Columns and Tilt Isolation for a Vibration Isolation System issued Nov. 10, 1998, which are all hereby incorporated by reference in this present application. These vibration isolators exhibit low stiffness, and low fundamental resonant frequencies, high damping to limit resonant responses of the composite system, effective isolation at the higher frequencies, and can provide high isolator internal resonant frequencies.

It would therefore be beneficial if a thermal strap or other coupling device could attain maximum thermal conductance while at the same time maximizing structural decoupling in order to effectively isolate vibrations from the motion-sensitive equipment. It also would be beneficial if tilt stiffness associated with the thermal strap could be reduced through application of negative stiffness for tilt, thereby improving the thermal coupling, It would also be beneficial if means could be shown for reducing parasitic heat transfer in the thermal strap. The present invention solves these and other needs.

SUMMARY OF THE INVENTION

My present invention provides improved means for reducing the vibrations or forces transmitted from a vibrating source on the spacecraft to a vibration-sensitive object on the spacecraft through a connection that has its stiffness reduced through the use of negative-stiffness mechanisms, and in particular, a thermal strap or cold strap or FCL between a vibrating cooling source such as a cryocooler and a motion-sensitive element such as an infrared (IR) detector or focal plane array (FPA) having highly critical alignment requirements.

My present invention provides a negative-stiffness mechanism that can remove axial stiffness, transverse stiffness and tilt stiffness from a thermal strap and provides improved thermal coupling and structural decoupling. By providing negative stiffness for tilt that was not shown in my previous invention, the present invention provides improved structural decoupling, thereby improving the thermal coupling, Means are also shown for reducing parasitic heat transfer.

One aspect of the present invention is a negative-stiffness mechanism that consists of two negative-stiffness mechanisms connected in series. A first negative-stiffness mechanism removes transverse stiffness from the thermal strap and includes axially-compressed axially oriented beam columns that connect to a base structure and an intermediate structure. The base structure connects to the vibrating cooling source such as the cryocooler. Another set of structural members also connects to the base structure and support compression springs that provide the axial compressive force on the beam-columns. The beam-columns are compressed beyond their critical buckling loads and thereby provide negative stiffness for translation of the intermediate structure in any transverse direction.

The intermediate structure supports a negative-stiffness mechanism that removes axial and tilt stiffness from the thermal strap. It consists of three axial-negative-stiffness-producing mechanisms that are radially spaced from the axial axis that passes through the center of the thermal strap and are circumferentially spaced at 120°. The axial-negative-stiffness-producing mechanisms consist of axially-compressed circumferentially-oriented flexures that are connected at their ends to spaced pairs of axially oriented flexures that are supported on the intermediate structure. The axially oriented flexures are deflected during assembly in order to provide the compressive force on the circumferentially oriented flexures. The centers of the circumferentially oriented flexures are connected to an end structure (or a portion of the payload structure) that connects to the cooled vibration sensitive element such as the FPA. The structural connections between the circumferentially oriented flexures and the end structure are thermally insulated in order to reduce parasitic heat transfer into the end structure and the FPA. The three axially compressed circumferentially oriented flexures are compressed beyond their critical buckling loads and thereby provide axial negative stiffness for axial translation of the end structure. Because of their radial spacing from the center axial axis they also provide tilt negative stiffness for rotation of the end structure in any tilt direction.

The base structure has an inner section and an outer section that are thermally insulated from each other to reduce parasitic heat transfer. The inner section connects to the cold tip of the cryocooler and the outer section connects to the body of the cryocooler. One end of the thermal strap also connects to the inner section of the base structure, and the cold tip of the cryocooler, and the other end connects to the end structure and the FPA. The structure forming the various negative-stiffness-producing mechanisms is connected to the outer section of the base structure in order to thermally insulate these structures from the cold tip of the cryocooler and the composite thermal strap.

Because the three axial-negative-stiffness-producing mechanisms are relatively stiff for translation in any transverse direction, the transverse negative stiffness produced by the axially compressed axially oriented beam columns produces nearly the same transverse negative stiffness for translation of the end structure in any transverse direction, thereby removing stiffness from the thermal strap in any transverse direction. Also, because the beam columns between the base structure and the intermediate structure are very stiff axially, the axial-and-tilt-negative-stiffness-producing mechanisms effectively remove axial and tilt stiffness from the thermal strap. The combined negative stiffness mechanisms therefore remove axial, transverse and tilt stiffness from the thermal strap.

All in all, the present invention provides an improved stiffness reducing system that will reduce the transmission of vibrations or forces from a vibrating source on the spacecraft to a vibration-sensitive object on the spacecraft through a connection such as a thermal strap that has its stiffness reduced through the use of negative-stiffness mechanisms. This reduction in stiffness can be performed with little or no reduction in the thermal coupling. This system can also provide better thermal coupling without reducing the structural decoupling as well as better thermal coupling and better structural decoupling compared with conventional thermal straps. Other features and advantages of the present invention will become apparent from the following detailed description when taken in conjunction with the accompanying drawings which illustrate, by way of example, the principles of the present invention.

DETAILED DESCRIPTION OF THE PREFERRED EMBODIMENTS

Figure 1:
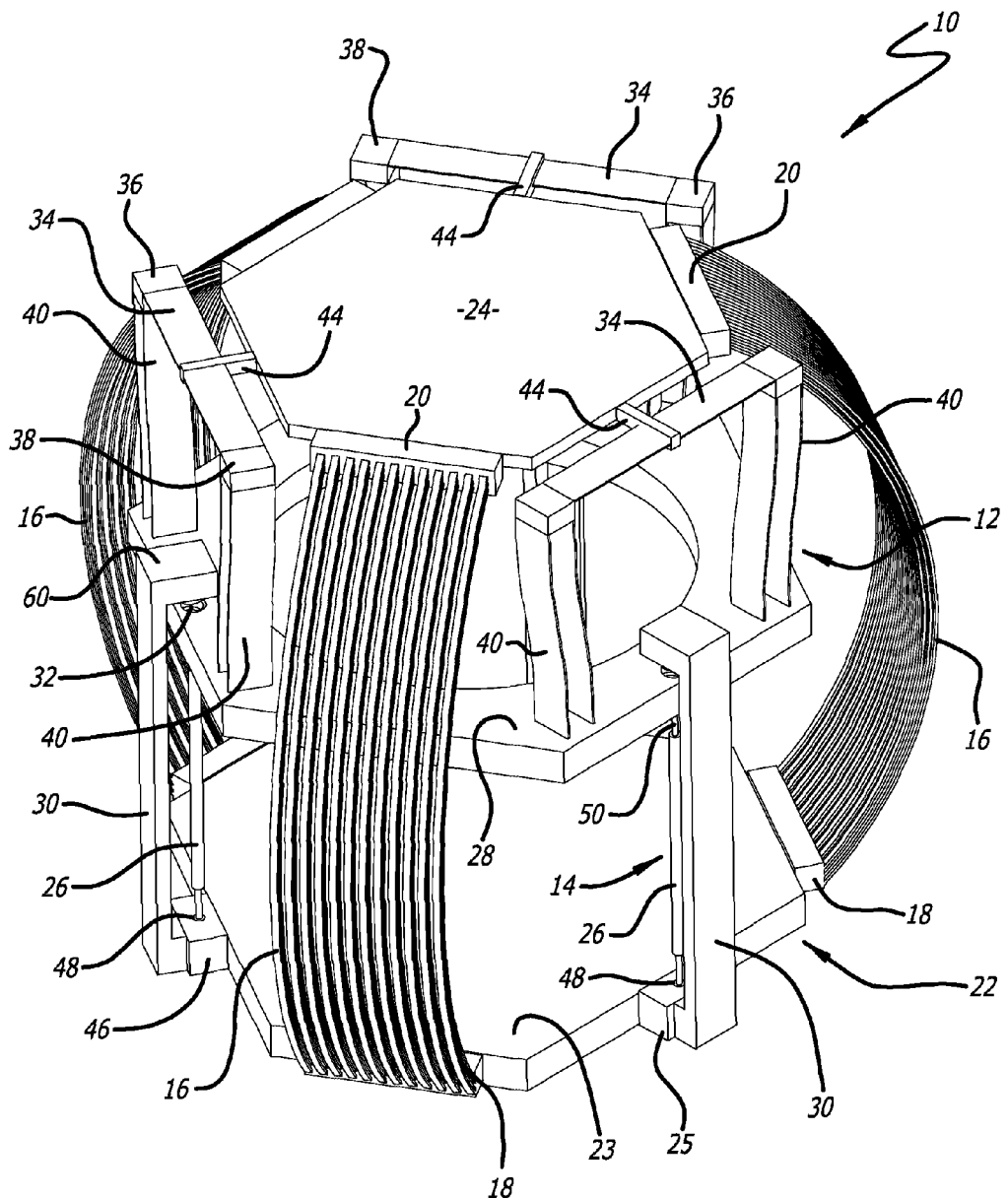
FIG. 1 is a perspective view of one embodiment of a negative-stiffness thermal strap made in accordance with the present invention.
Figure 2:
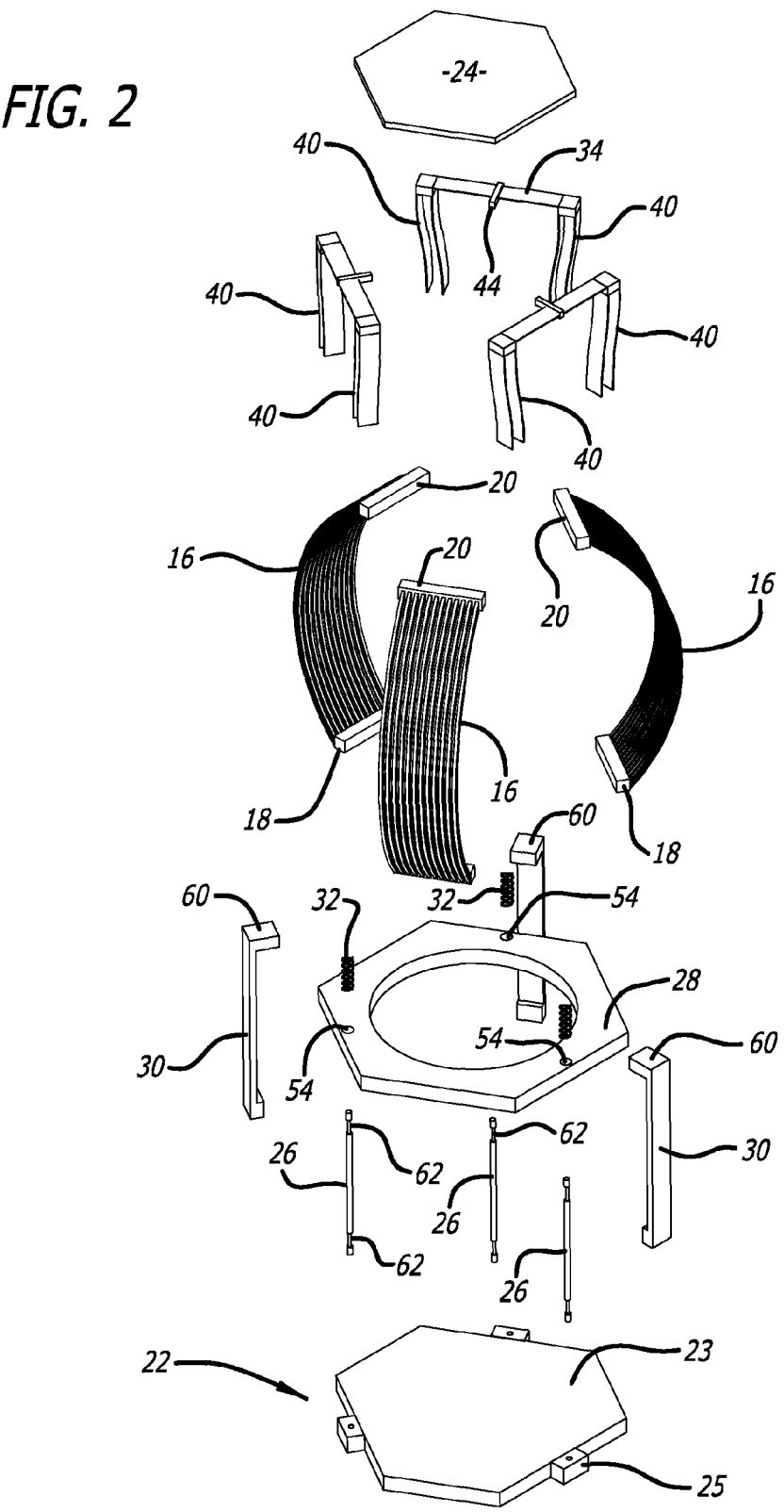
FIG. 2 is a blown up view showing the various components which form the negative-stiffness thermal strap of FIG. 1.
Figure 3:
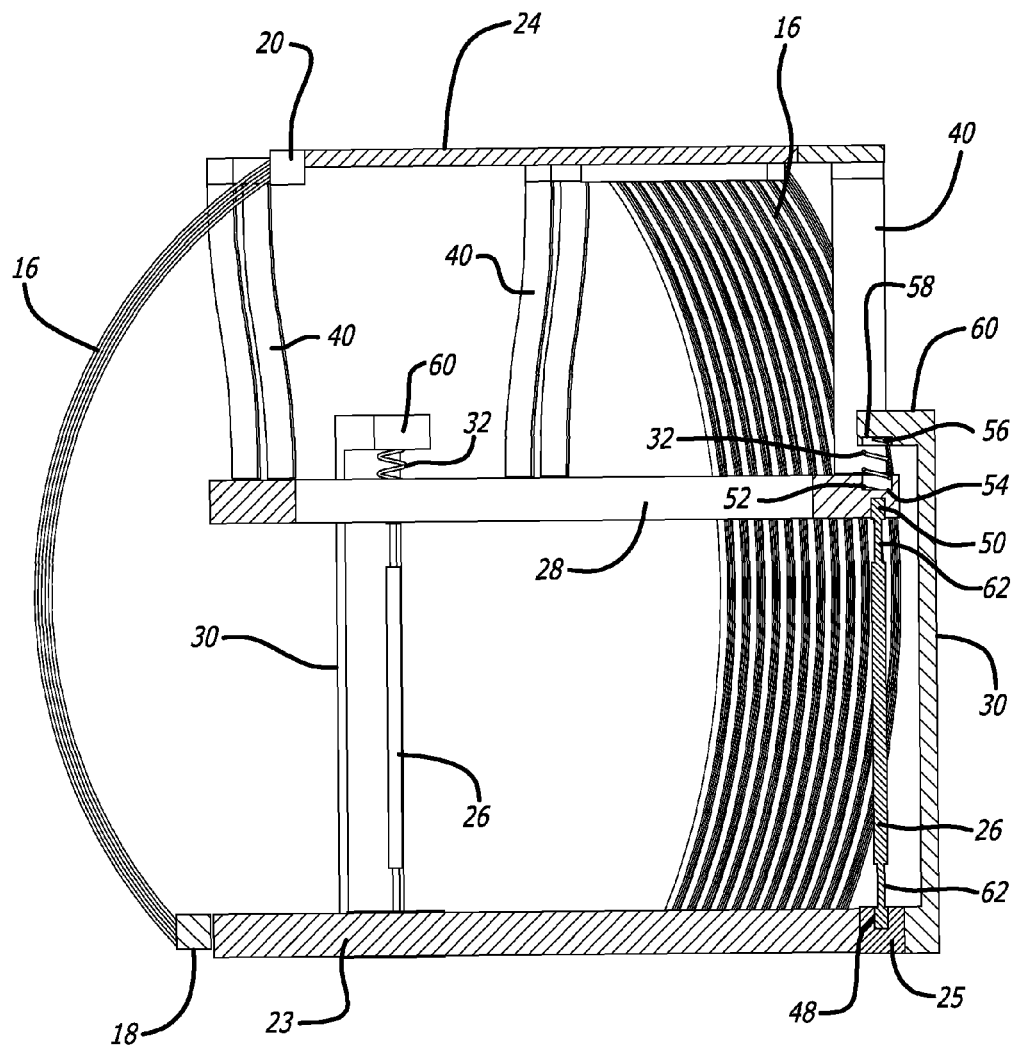
FIG. 3 is a cross sectional view of the negative-stiffness thermal strap shown in FIG. 1.
Figure 4:
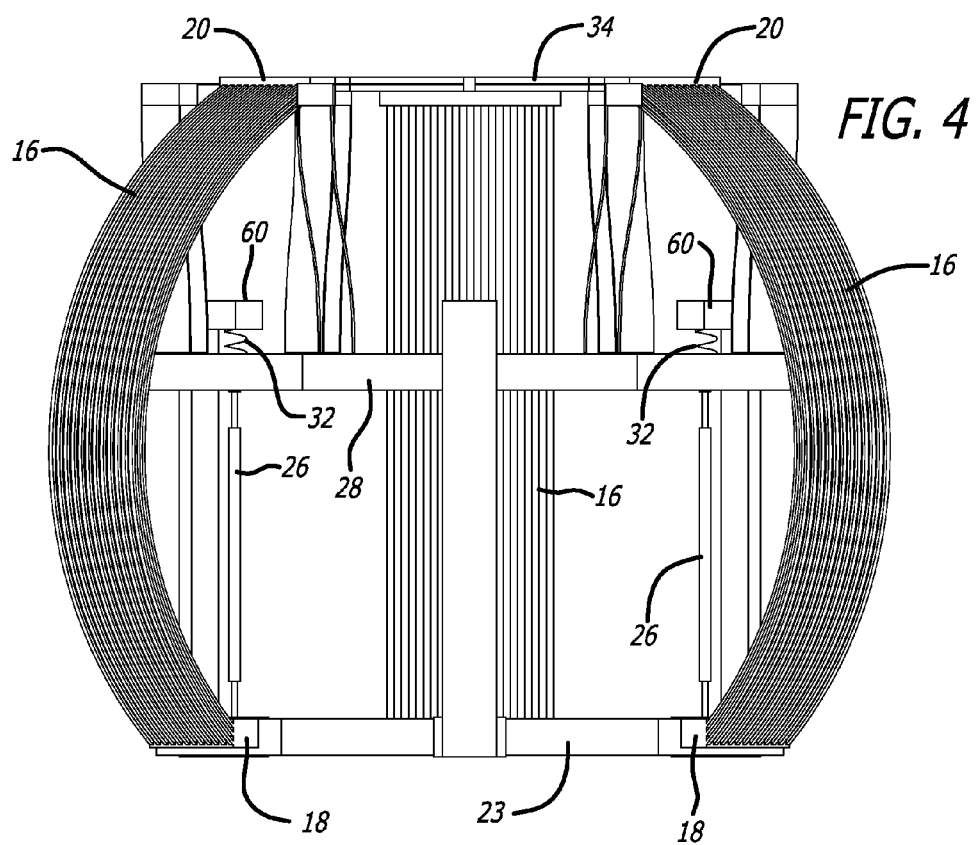
FIG. 4 is another side elevational view of the negative-stiffness thermal strap shown in FIG. 1.
Figure 5:
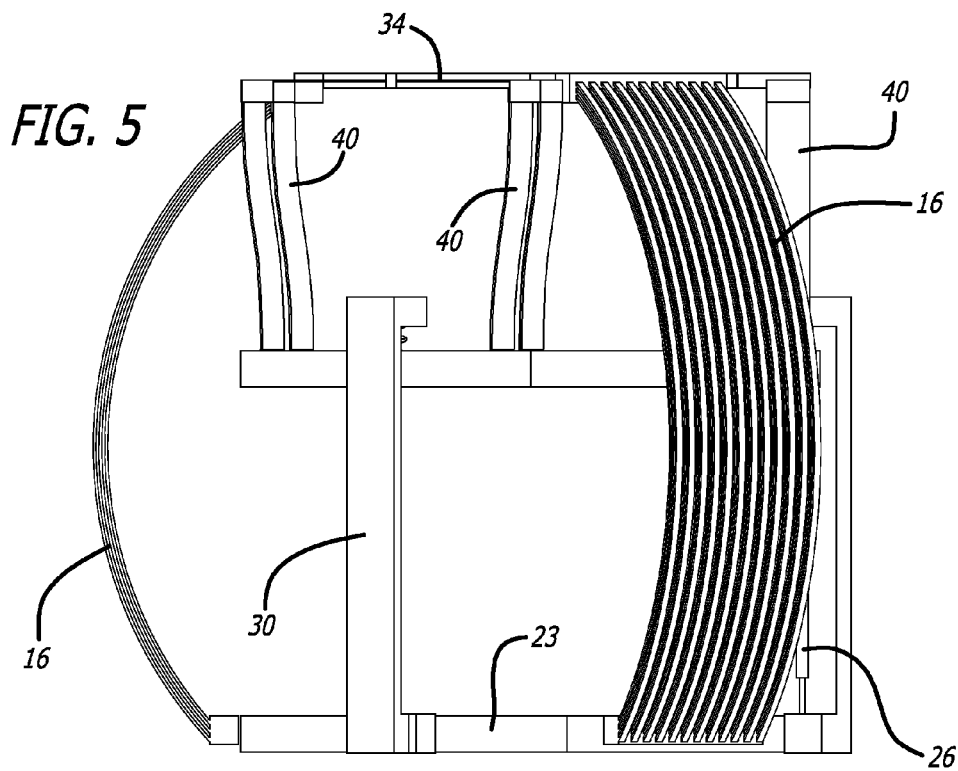
FIG. 5 is another side elevational view of the negative-stiffness thermal strap shown in FIG. 1.
Figure 6:
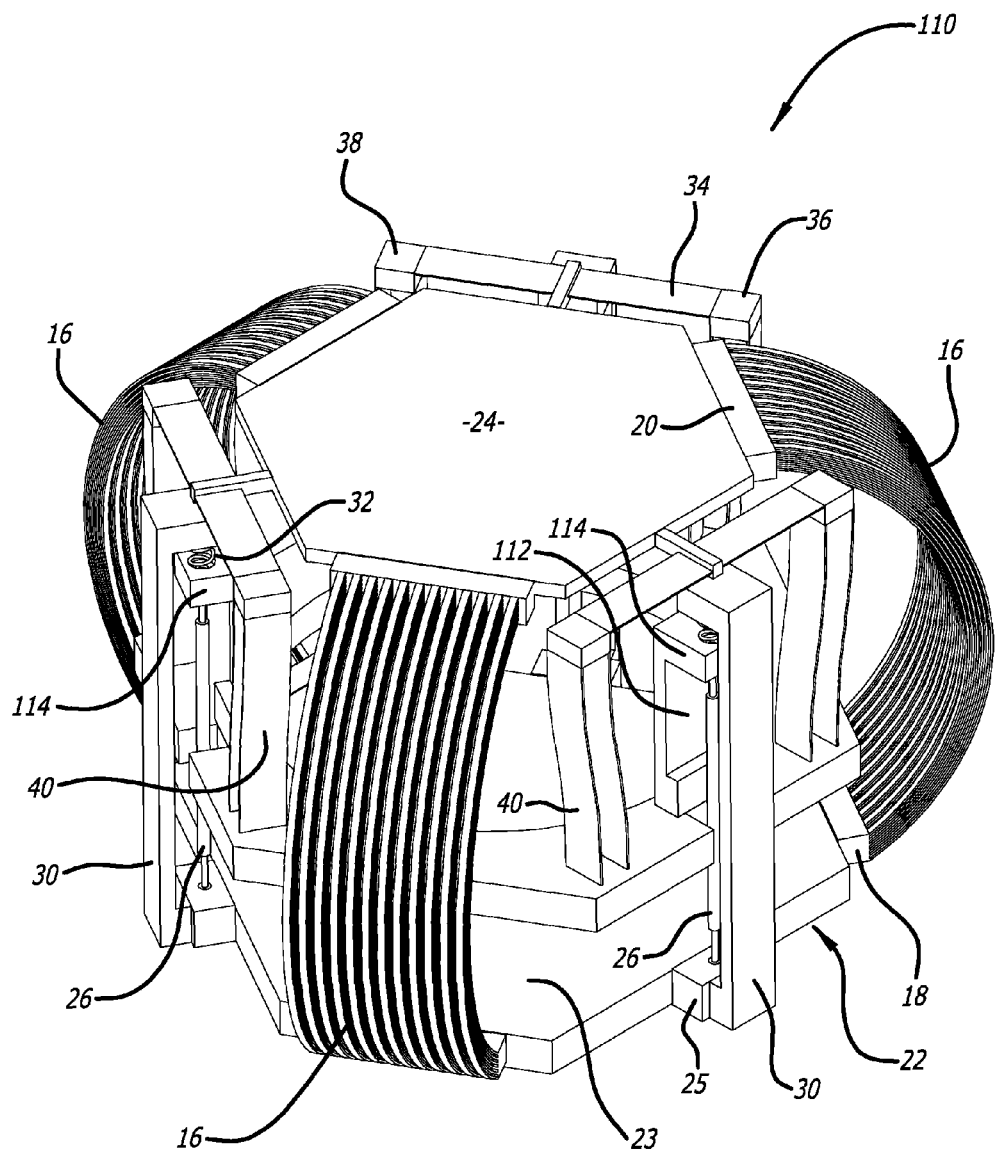
FIG. 6 is a perspective view of another embodiment of a negative-stiffness thermal strap made in accordance with the present invention.
Figure 7:
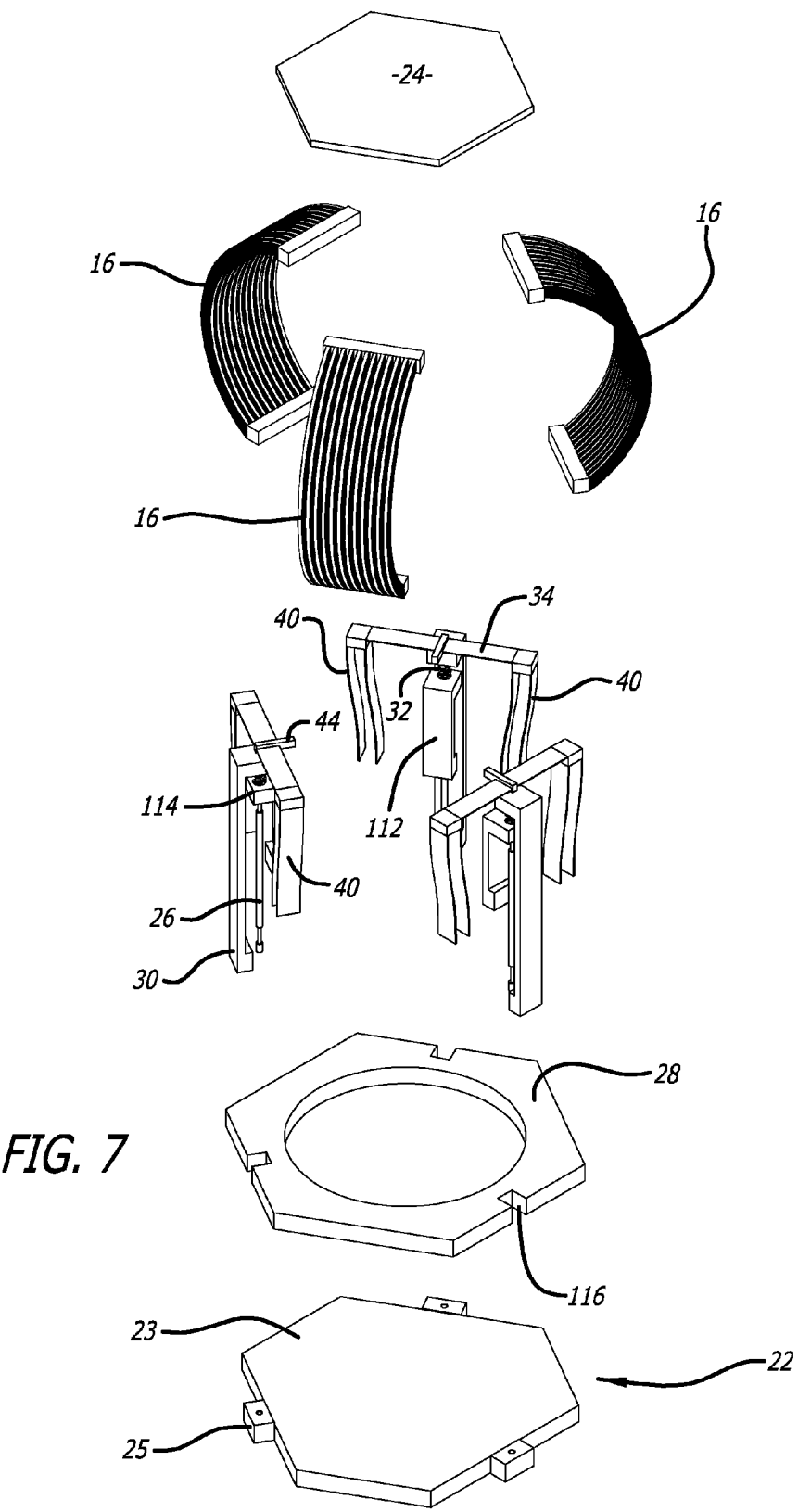
FIG. 7 is a blown up view showing the various components which form the negative-stiffness thermal strap of FIG. 6.
Figure 8:
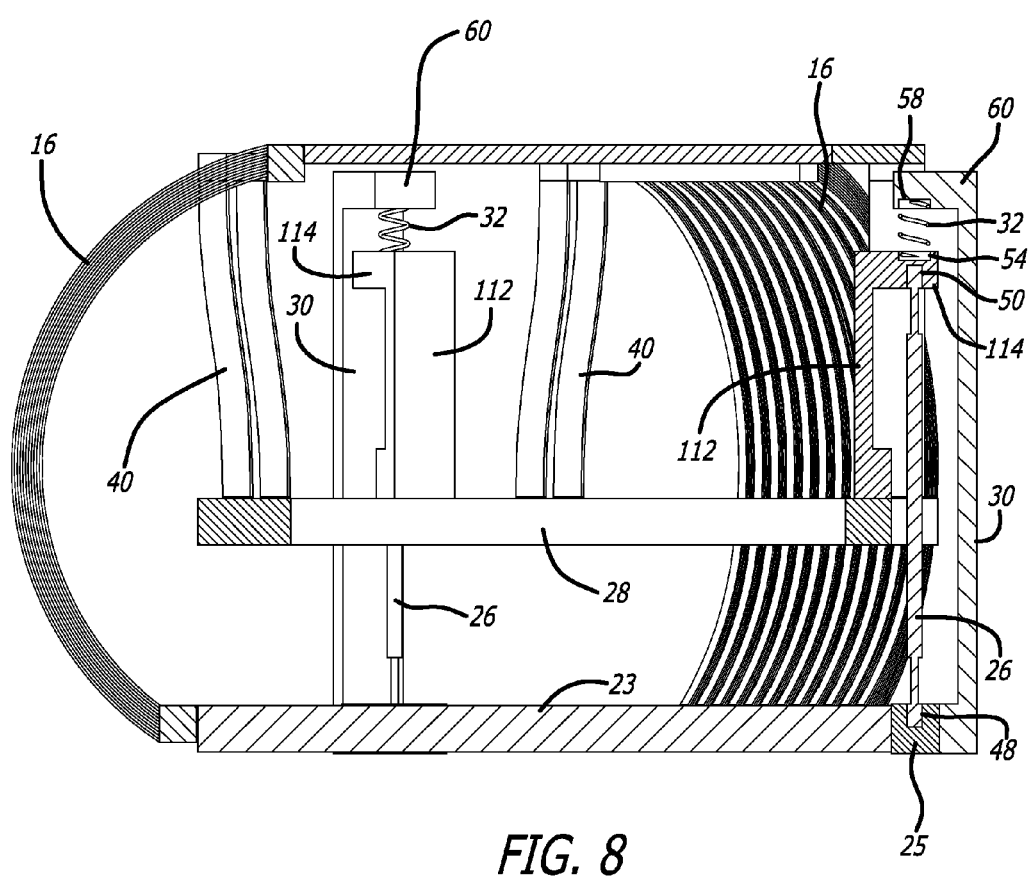
FIG. 8 is a cross sectional view of the negative-stiffness thermal strap shown in FIG. 6.
Figure 9:
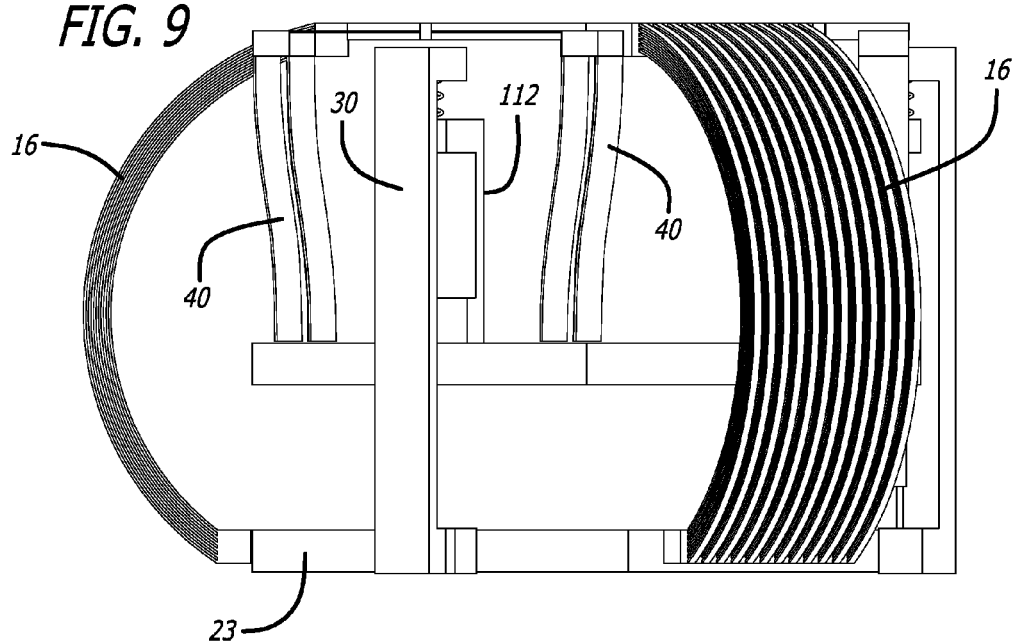
FIG. 9 is another side elevational view of the negative-stiffness thermal strap shown in FIG. 6.
Figure 10:
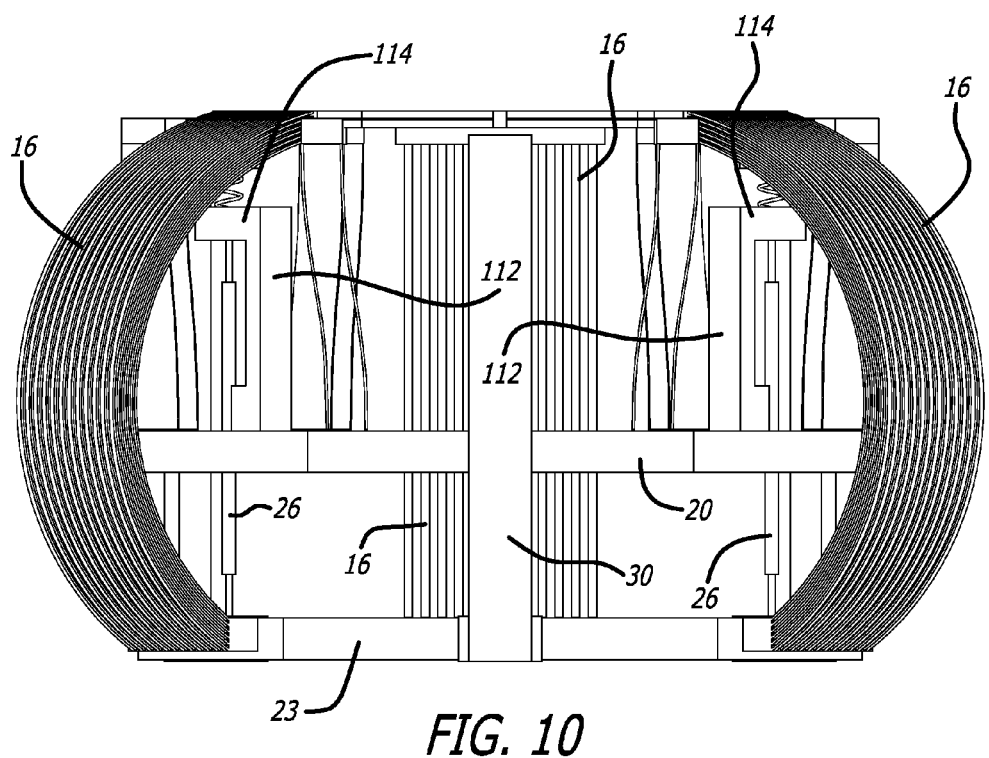
FIG. 10 is another side elevational view of the negative-stiffness thermal strap shown in FIG. 6.

As is shown in the drawings for purposes of illustration, the present invention is embodied in a stiffness reducing system that reduces vibrations or forces transmitted from a vibrating source on the spacecraft to a vibration-sensitive object on the spacecraft through a connection that has its stiffness reduced through the use of negative-stiffness mechanisms. As the present invention is described in detail as applied to particular negative-stiffness thermal straps or NSFCLs shown in FIGS. 1-10, those skilled in the art will appreciate that these systems can be used with other structural components used to couple vibration-sensitive objects with a vibrating source on a spacecraft.

FIGS. 1-5 show one embodiment of a composite negative-stiffness thermal strap or NSFCL 10 made in accordance with the present invention. The NSFCL 10 is designed to reduce the transmission of omnidirectional vibrations between a vibration sensitive object and the vibrating source. A axial-tilt negative-stiffness-producing mechanism 12 and a transverse negative-stiffness-producing mechanism 14 are connected in series and are coupled with conventional FCLs to reduce their stiffness and improve their structural decoupling. As can be seen in FIGS. 1-5, the composite NSFCL 10 is made from a number of individual FCLs 16, each having a first end 18 and second end 20. Each of the first ends 18 of the FCLs are connected to a base structure 22 having an inner portion 23 and each of the second ends 20 are connected to an end structure 24. For example, the inner portion 23 of the base structure 22 could be connected to a vibrating cooling source such as the cryocooler. The end structure 24 could be attached to, for example, a motion-sensitive element such as an infrared (IR) detector or focal plane array (FPA) having highly critical alignment requirements. These individual FCLs 16 are operatively connected with the axial-tilt negative-stiffness-producing mechanism 12 and the transverse negative-stiffness-producing mechanism 14 and are also thermally insulated from the straps as well, as will be explained below. The combined negative stiffness mechanisms 12 and 14 therefore remove axial, transverse and tilt stiffness from the FCL.

The base structure 22 further includes an outer portion 25 which is designed for attachment to the negative-stiffness-producing mechanisms 12 and 14 and the supporting structures associated with these mechanisms 12 and 14. The base structure 22 can be designed to minimize parasitic heat transfer between the outer portion 25 and the inner portion 23 which can be kinematically connected to provide flexibility to cope with differential thermal expansions between the warmer outer portion 25 and cooler inner portion 23 and provide sufficient stiffness so that the negative-stiffness mechanisms operate properly. In that regard, the inner portion 23 and outer portion 25 of the base structure 22 must be structurally connected together to act as a single vibrating structure, yet must remain thermally isolated from each other to minimize parasitic heat transfer. The outer portion 25 can be made from a thermally isolating material which is sufficiently strong support the components mounted thereto while creating thermal isolation between the mounted components and the components attached to the inner portion 23 of the base structure 22.

The transverse negative-stiffness mechanism 14 is designed to remove transverse stiffness from the composite NSFCL 10 and includes axially-compressed axially oriented beam columns 26 that connect to the base structure 22 and an intermediate structure 28. A set of structural members, referred to as compression spring supports 30, is also connected to the outer portion 25 of the base structure 22. Each beam column 26 is associated with a support compression spring 32 that provides an axial compressive force on the beam-column 26. Each of the beam-columns 26 are compressed beyond their critical buckling loads and thereby provide negative stiffness for translation of the intermediate structure 28 in any transverse direction.

The intermediate structure 28 supports the axial-tilt negative-stiffness mechanisms 12 that remove the axial and tilt stiffness from the NSFCL. As is shown in FIGS. 1-5, which shows one particular embodiment of the invention, three axial-tilt negative-stiffness-producing mechanisms 12 are radially spaced from the axial axis that passes through the center of the NSFCL and are circumferentially spaced at 120°. Each individual axial-tilt negative-stiffness-producing mechanism 12 consist of at least one axially-compressed circumferentially-oriented flexure 34 that is connected at its ends with end blocks 36, 38 to a pair of spaced axially oriented end flexures 40 that are supported on the intermediate structure 28. Each axially oriented end flexure 40 is deflected during assembly in order to provide the compressive force on its associated circumferentially oriented flexure 34. The center of each circumferentially-oriented flexure 34 is connected to a thermally insulated structural connector 44 that is connected to the end structure 24 (or the payload structure) that connects to the cooled vibration sensitive element such as the FPA, thereby reducing parasitic heat transfer into the end structure and the FPA. The three axially-compressed circumferentially oriented flexures 34 are compressed beyond their critical buckling loads and thereby provide axial negative stiffness for axial translation of the end structure 24. Because of their radial spacing from the center axial axis, these axially-compressed circumferentially oriented flexures 34 also provide tilt negative stiffness for rotation of the end structure 24 in any tilt direction.

The inner portion 23 of the base structure 22 and each compression spring support 30 are thermally insulated from each other to reduce parasitic heat transfer by mounting each of the compression spring supports 30 on the outer portion 25 of the base structure 22. The axially oriented beam-columns 26 of the transverse negative-stiffness mechanism 14 are in the form of thin cylindrical rods. Each beam-column 26 includes a first end 48 which is press fitted into the outer portion 25 of the base structure 22. The second end 50 of each beam column 26 is attached (via a press fitting) to the intermediate structure 28 (see FIG. 3). The compression spring 32 includes a first end 52 which sits within a recess 54 formed on the intermediate structure 28. The other end 56 of the compression spring 32 is placed within a recess 58 formed on the upper plate 60 of the compression spring support 30. Each compression spring 32 applies a compressive force on its associated beam column 26. Each beam column 34 may have a notched region 62 located near each end 48, 50 which can provide design versatility for the beam columns. During assembly, the beam-columns 26 are compressed beyond their critical buckling loads and thereby provide negative stiffness for translation of the intermediate structure 28 in any transverse direction. This negative stiffness removes positive stiffness from the FCLs 16 as well as the positive stiffness of the compression spring 32.

Referring now to FIGS. 6-10, another embodiment of a composite negative-stiffness thermal strap or NSFCL 110 is disclosed. This NSFCL 110 utilizes the same basic components used in conjunction with the embodiment of FIGS. 1-5. However, in this embodiment, intermediate structure extensions 112 are utilized in conjunction with the compression spring supports 30. These intermediate structure extensions 112 allow for a reduction in the height of the unit for the same lengths of the beam-columns 26 and the end flexures 40. As can best be seen in FIG. 8, the first end 48 of each beam column 26 is press fitted into the outer portion 25 of the base structure 22. However, the second end 50 of each beam column 26 is not placed directly into the intermediate structure 28, as is shown in the previous embodiment, but rather, is press fitted into a top plate 114 formed on the intermediate structure support 112. As can be seen in the figures, each intermediate structure extension 112 is mounted to the intermediate structure 28 and extends upward to its top plate 114 which receives the end 50 of the beam column 26. The compression spring 32, in turn, is placed between the upper plate 60 of the compression spring support 30 and the top plate 114 of the intermediate structure extension 112. Notches 116 are formed in the intermediate structure 28 to allow for the beam-columns 26 The compression springs 32 produce the same compressive force that will be placed on each beam column 26. During assembly, the beam-columns 26 are compressed beyond their critical buckling loads and thereby provide negative stiffness for translation of the intermediate structure 28 in any transverse direction.

The FCLs that can be used in accordance with the present invention include the conventional FCLs disclosed herein along with still other FCLs. For example, standard foil FCLs, such as the ones shown in my previous thermal strap invention, Improved Thermal Straps for Spacecraft, U.S. application Ser. No. 13/587,207, filed on Aug. 16, 2012, could be utilized as well. While the embodiments disclosed herein show the use of three FCLs to create a composite NSFCL unit, it should be appreciated that more of even less FCLs could be utilized. It should be appreciated that the number, type and arrangement of FCLs can be varied without departing from the spirit and scope of the present invention. Also, it should be appreciated that the size, shape and makeup of the FCL used in accordance with the present invention is not limited to the particular FCLs depicted in FIGS. 1-10, but could include any one of a number of FCLs. Additionally, the embodiments disclosed herein utilize three beam-columns to support the intermediate structure 28. It should be noted that more or less beam-columns could be utilized to support the intermediate structure without departing from the spirit and scope of the present invention.

The FCLs can be made from materials having high thermal conductivity, such as pure aluminum and pure copper. The inner portion 23 of the base structure 22 could be made from materials with very high thermal conduction materials such as pure copper or pure aluminum. The outer portion 25 of the base structure 22 and the thermally insulated structural connector 44 can be made from high strength-to-weight structural metal alloys or structural materials having low thermal conductivities. Similarly, the components in the negative-stiffness mechanisms could be made from high strength-to-weight structural metal alloys such as aluminum and titanium alloys or structural materials having low thermal conductivities. Other structural materials having suitable strength, elastic, thermal and mass properties can also be used.

While one particular form of the invention has been illustrated and described, it will be apparent that various modifications can be made without departing from the spirit and scope of the invention. Accordingly, it is not intended that the invention be limited, except by the attached claims.

We claim:

1. A negative-stiffness thermal strap, comprising:
a thermal strap which provides thermal coupling and structural decoupling between a vibration-sensitive object and a vibrating cooling source, the thermal strap having positive axial stiffness and positive tilt stiffness; and
an axial-tilt negative-stiffness-producing mechanism is connected to the thermal strap and acts on the thermal strap to reduce some of the positive axial stiffness and the positive tilt stiffness thereby forming the negative-stiffness thermal strap.

2. The negative-stiffness thermal strap of claim 1, wherein the thermal strap has positive transverse stiffness and a transverse negative-stiffness-producing mechanism is connected to the thermal strap to reduce some of the positive transverse stiffness thereby forming the negative-stiffness thermal strap.

3. The negative-stiffness thermal strap of claim 2, wherein the axial-tilt negative-stiffness-producing mechanism and transverse negative-stiffness-producing mechanism are connected in series.

4. The negative-stiffness thermal strap of claim 1, wherein the axial-tilt negative-stiffness producing mechanism includes three axially-compressed circumferentially-oriented flexures that are circumferentially spaced at 120°.

5. The negative-stiffness thermal strap of claim 2, wherein the transverse negative-stiffness-producing mechanism includes a plurality of axially compressed beam-columns oriented in an axial direction.

6. The negative-stiffness thermal strap of claim 3, wherein the transverse negative-stiffness-producing mechanism includes a plurality of axially compressed beam-columns oriented in an axial direction.

7. The negative-stiffness thermal strap of claim 1, wherein the axial-tilt negative-stiffness-producing mechanism includes at least one axially-compressed flexure that is oriented in a transverse direction.

8. The negative-stiffness thermal strap of claim 6, wherein the axial-tilt negative-stiffness producing mechanism includes three axially-compressed circumferentially-oriented flexures that are circumferentially spaced at 120°.

9. The negative-stiffness thermal strap of claim 1, wherein the axial-tilt negative-stiffness-producing mechanism is thermally isolated from the thermal strap.

10. The negative-stiffness thermal strap of claim 2, wherein the transverse negative-stiffness-producing mechanism is thermally isolated from the thermal strap.

11. The negative-stiffness thermal strap of claim 1, wherein the axial-tilt negative-stiffness-producing mechanism is made from a material that has relatively low thermal conductivity relative to the material used to make the thermal strap.

12. The negative-stiffness thermal strap of claim 2, wherein the transverse negative-stiffness-producing mechanism is made from a material that has relatively low thermal conductivity relative to the material used to make the thermal strap.

13. The negative-stiffness thermal strap of claim 3, wherein the axial-tilt negative-stiffness-producing mechanism is thermally isolated from the thermal strap and the transverse negative-stiffness-producing mechanism is thermally isolated from the thermal strap.

14. A negative-stiffness flexible conductive link which provides thermal coupling between a vibration-sensitive object and a vibrating cooling source, comprising:
three flexible conductive links, each of flexible conductive links having a composite positive axial stiffness, positive transverse stiffness and positive tilt stiffness;
an axial-tilt negative-stiffness-producing mechanism which acts on each of the flexible conductive links to reduce the composite positive axial stiffness and positive tilt stiffness of the flexible conductive links; and
a transverse negative-stiffness-producing mechanism which acts on each of the flexible conductive links to reduce the composite positive transverse stiffness of the flexible conductive links.

15. The negative-stiffness flexible conductive link of claim 14, wherein the axial-tilt negative-stiffness-producing mechanism includes at least one flexure that is oriented in a transverse direction and is coupled to the flexible conductive links, and the axial-tilt negative-stiffness-producing mechanism is designed to apply a compressive force on the at least one flexure.

16. The negative-stiffness flexible conductive link of claim 14, wherein the transverse negative-stiffness-producing mechanism includes a plurality of axially compressed beam-columns oriented in the axial direction.

17. The negative-stiffness flexible conductive link of claim 14, wherein the three flexible conductive links are circumferentially spaced at 120°.

18. The negative-stiffness flexible conductive link of claim 17, wherein the axial-tilt negative-stiffness producing mechanism includes three axially-compressed circumferentially-oriented flexures that are circumferentially spaced at 120°.

19. The negative-stiffness flexible conductive link of claim 18, wherein each of the three flexible conductive links is placed between adjacent flexible conductive links.

20. The negative-stiffness flexible conductive link of claim 14, wherein the axial-tilt negative-stiffness-producing mechanism and the transverse negative-stiffness-producing mechanism are thermally isolated from the conductive links.

21. The negative-stiffness flexible conductive link of claim 14, wherein the axial-tilt negative-stiffness-producing mechanism and the transverse negative-stiffness-producing mechanism are made from materials that have relatively low thermal conductivity relative to the material used to make the conductive links.

\* \* \* \* \*